United States Patent [19]

Tackett et al.

[11] Patent Number: 5,299,859
[45] Date of Patent: Apr. 5, 1994

[54] COMBINATION SOLENOID VALVE AND SHUTTLE VALVE

[75] Inventors: Wendell D. Tackett, South Bend, Ind.; Larry G. Lohraff, Berrien Springs, Mich.; Jay A. Hendershot, South Bend, Ind.; Gamil M. Rizk, South Bend, Ind.; Thomas A Grana, South Bend, Ind.; George E. Brown; Timothy J. Albert, both of Niles, Mich.

[73] Assignee: Allied-Signal Inc., Morristown, N.J.

[21] Appl. No.: 792,550

[22] Filed: Nov. 15, 1991

[51] Int. Cl.⁵ ................... F15B 13/044; B60T 8/36
[52] U.S. Cl. ...................... 303/119.2; 137/596.17; 303/84.2
[58] Field of Search .................. 303/119 SV, 115 EC, 303/84.1, 84.2, 113 R, 113 TR, 9.62, 119.2, 115.2, 113.1, 113.2; 137/596.17

[56] References Cited

U.S. PATENT DOCUMENTS

| | | | |
|---|---|---|---|
| 3,909,073 | 9/1975 | de Gennes | 303/115 EC |
| 4,719,300 | 12/1987 | Heess et al. | 303/115 EC |
| 4,844,114 | 7/1989 | Martinic | 303/119 SV |
| 4,844,119 | 7/1989 | Martinic | 137/596.1 |
| 4,859,005 | 8/1989 | Rey et al. | 303/119 SV |
| 4,915,459 | 4/1990 | Hashida et al. | 303/117 |
| 4,936,344 | 6/1990 | Gilbert et al. | 137/596.1 |
| 4,938,545 | 7/1990 | Shuey et al. | 303/84.2 |
| 5,123,718 | 6/1992 | Tyler | 303/119 SV |

FOREIGN PATENT DOCUMENTS

| | | |
|---|---|---|
| 0379957 | 8/1989 | European Pat. Off. |
| 0342091 | 11/1989 | European Pat. Off. |
| 0423755 | 4/1991 | European Pat. Off. |
| 58-49548 | 3/1983 | Japan |
| 58-61053 | 4/1983 | Japan |
| 59-8554 | 1/1984 | Japan |
| 62-255265 | 11/1987 | Japan |
| 2179110 | 2/1987 | United Kingdom |
| 2184184 | 6/1987 | United Kingdom |
| 2236156 | 3/1991 | United Kingdom ......... 303/119 SV |

Primary Examiner—Matthew C. Graham
Attorney, Agent, or Firm—Larry J. Palguta; Ken C. Decker

[57] ABSTRACT

The combination solenoid valve and shuttle valve (60, 160A-D, 260A-D) comprises a shuttle valve (50, 150) which is slidingly and sealingly received at or adjacent an end of the solenoid valve (40, 140). The shuttle valve (50, 150) includes a stepped interior opening (54, 154) which sealingly receives the end of the solenoid valve (40) or a valve part (140A), such that slidable movement of the shuttle valve (50) causes an insert (55, 55A, 155) within the interior opening (54, 154) to seat sealingly over either a solenoid insert seat (41C) or insert seat (141C) of the valve part (140A) in order to isolate pressure chambers (12A, 12B; 112A, 112B; 212A, 212B) of a master cylinder/hydraulic booster (12, 112, 212A, 212B) from a wheel brake (16, 116A-D, 216A-D). The shuttle valve (50, 150) may include a one way build orifice (30, 30A, 130) which permits restricted fluid flow between a pressure source (18, 101, 201) and the wheel brake (16, 116A-D, 216A-D), a feedback orifice (36, 36A) which permits restricted fluid flow from the pressure source (18) to the master cylinder (12), a pump check valve (23, 123) which prevents fluid flow from the shuttle valve (50, 150) back toward the pressure source (18, 101, 201) and a poppet check valve or floating feedback washer (38, 38A) which when displaced permits fluid flow from the master cylinder (12) toward the wheel brake (16).

34 Claims, 6 Drawing Sheets

COMBINATION SOLENOID VALVE AND SHUTTLE VALVE

BACKGROUND OF THE INVENTION

The present invention relates generally to a combination solenoid valve and shuttle valve, and in particular to an electrically operated valve mechanism for an adaptive braking system.

Numerous adaptive braking systems have been proposed previously. Adaptive braking systems can typically include numerous solenoid valves, check valves, flow restrictions, shuttle valves, and various types of pressure source mechanisms. In adaptive braking systems which utilize solenoid valves and shuttle valves, it is highly desirable to combine structurally a solenoid valve with its respective shuttle valve. Combined solenoid valve and shuttle valve structures are disclosed in U.S. Pat. Nos. 4,620,565; 4,844,119; and 4,936,344. The combined structure has the potential for greatly simplifying the number and complexity of plumbing connections, and substantially reducing the cost of the entire system. It is desirable to provide a combination solenoid valve and shuttle valve structure which can be easily packaged together and which provides a complexity of functions that significantly exceeds the functions illustrated in Brown U.S. Pat. No. 4,620,565, Martinic U.S. Pat. No. 4,844,119 and Gilbert et al. U.S. Pat. No. 4,936,344. The complexity of functions that are desired may comprise the equivalent of numerous check valves, fluid flow restrictions, fluid pressure connections, and springs utilized in the check valve structures.

SUMMARY

The present invention provides solutions to the above problems by providing a combination solenoid valve and shuttle valve, comprising a body having therein a bore comprising a first bore section, second bore section, and third bore section sealingly isolated from one another at the perimeter of the bore, a solenoid valve disposed within the bore and operable to open a valve therein in order to communicate said second bore section with said third bore section, and a shuttle valve disposed sealingly and slidably within said first and second bore sections, the shuttle valve having an interior opening which is received sealingly and slidably at an end of said solenoid valve, the bore communicating at one end with a pressure source and the shuttle valve slidable to cooperate with said end of the solenoid valve in order to direct fluid from the pressure source primarily to the valve of the solenoid valve.

BRIEF DESCRIPTION OF THE DRAWINGS

The invention is described in detail below with reference to the drawings which illustrate embodiments in which.

DETAILED DESCRIPTION OF THE DRAWINGS

Figure 1:
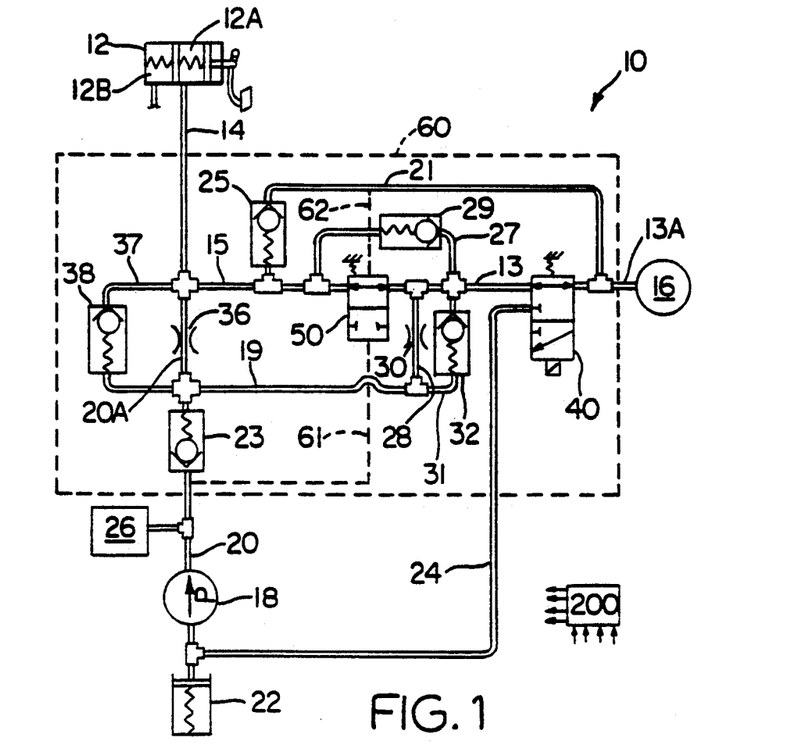
FIG. 1 is an illustration of a pump back adaptive braking system diagram including the present invention whose equivalent functions are illustrated schematically.

The functions of a combination solenoid valve and shuttle valve in an adaptive braking system are illustrated in FIG. 1. Adaptive braking system 10 includes a pressure producing device such as a master cylinder 12 connected by chamber 12A and line 14 with a front wheel brake 16. Adaptive braking system 10 is illustrated only partially, the system typically comprising a duplicative schematic for the other (not shown) front wheel brake, and a second chamber 12B of the master cylinder connected via another duplicative schematic to the two rear wheel brakes in a typical Y-circuit configuration. Of course, a cross or X-type braking circuit configuration such as that illustrated in FIG. 5 can also be utilized. The present invention is illustrated in FIG. 1 as an exemplary application of the invention for one wheel brake, and the application of the present invention to all four wheel brakes of various systems will be readily apparent from the following detailed description. Besides wheel brake 16, adaptive braking system 10 includes pump 18 connected with lines or passages 14 and 15 by fluid communications, lines or passages 20 and 20A, and a sump 22 connected with an inlet end of pump 18 and with decay solenoid valve 40 via fluid communication, line or passage 24. Line 20 includes a connection with noise chamber 26 which provides dampening of hydraulic noise generated within the circuit. Line 15 connects with shuttle valve 50, and fluid communication, line or passage 13A connects with solenoid valve 40, and fluid communication, line or passage 13A connects with wheel brake 16. Shuttle valve 50 has pressure connections 61 and 62 so that the shuttle valve is responsive to fluid pressure generated by pump 18 and fluid pressure present at wheel brake 16, the wheel brake pressure being communicated to connection 62 via bypass fluid communication or release line 21. Release line 21 includes one-way check valve 25 and permits fluid to flow, when a pressure differential exists, from wheel brake 16 back toward master cylinder 12. Bypass release line 21 bypasses both solenoid valve 40 and shuttle valve 50. As a redundant protective feature, bypass fluid communication or line 27 bypasses shuttle valve 50 and includes one-way flow check valve 29. This permits fluid pressure to bypass shuttle valve 50 but not bypass solenoid valve 40. Line 20A includes a feedback restriction 36 and feedback restriction bypass line 37 includes one-way check valve 38.

Lines 14, 15, 13 and 13A provide a first fluid communication or connection line extending between the wheel brake 16 and the master cylinder or pressure producing device 12. Lines 20A, 19, 28 and 31 provide a second connection fluid communication or line which bypasses shuttle valve 50 and connects with the first connection line at a point between the shuttle valve and solenoid valve. Lines 20 and 24 provide a return line between the solenoid valve and second fluid communication or connection line and includes pump 18. Bypass line 37 bypasses restriction 36 of the second connection line.

Pump 18, during adaptive braking system operation by ECU 200 which communicates with not shown wheel speed sensors, provides fluid pressure via line 20 and pump check valve 23 to line 19 which connects with lines 28, 31 and 13 and solenoid valve 40 in order to transmit fluid pressure to wheel brake 16 when shuttle valve 50 has moved to an activated position wherein master cylinder fluid pressure can no longer flow via line 15 to line 13. In order to regulate the fluid pressure communicated by pump 18 to wheel brake 16, build orifice 30 is located in line 28 which connects line 19 with line 13. One-way self-cleaning check valve 32 located in line 31 permits fluid pressure to flow from wheel brake 16 through solenoid valve 40 to line 19 and back toward master cylinder 12. Feedback restriction 36 is located in line 20A and permits restricted fluid flow from pump 18 back toward master cylinder 12. Feedback restriction bypass line 37 contains one-way check valve 38 which will permit higher pressure created by master cylinder 12 to flow around feedback restriction 36 and to line 19 for transmission to wheel brake 16 when the master cylinder created pressure is higher than the pressure in line 19 from pump 18. The dotted line box 60 in FIG. 1 indicates that all of the structure and functions schematically illustrated in FIG. 1 are contained within a single component 60 comprising a combination solenoid valve and shuttle valve of the present invention.

Figure 2:
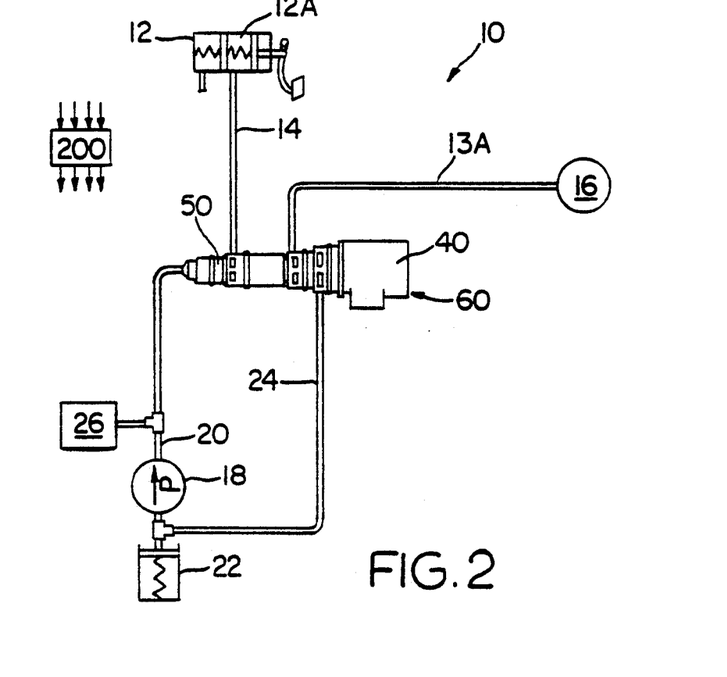
FIG. 2 is a schematic of the adaptive braking system of FIG. 1 and illustrating the plumbing connections effected by a combination solenoid valve and shuttle valve of the present invention.

Referring to FIG. 2, there is illustrated the actual hardware and plumbing connections which correspond to the functional schematic of FIG. 1. Master cylinder 12 is connected by line 14 with shuttle valve 50 which slidably and sealingly engages an end of solenoid valve 40. Solenoid valve 40 communicates via line 13A with wheel brake 16, while line 24 communicates decay solenoid valve 40 with sump 22 and the inlet of pump 18. Pump 18, when adaptive braking system 10 is energized, provides fluid pressure through line 20 to shuttle valve 50, with noise chamber 26 communicating with line 20. As can be readily seen by comparing FIGS. 1 and 2, the complexity of functions provided by the combination solenoid valve and shuttle valve 60 of the present invention is provided in adaptive braking circuit 10 despite the minimal plumbing connections illustrated in FIG. 2. An embodiment of the combination solenoid valve and shuttle valve of the present invention will now be explained in detail with reference to FIG. 3, and corresponding structure will use the same reference numerals as in FIGS. 1 and 2.

Figure 3:
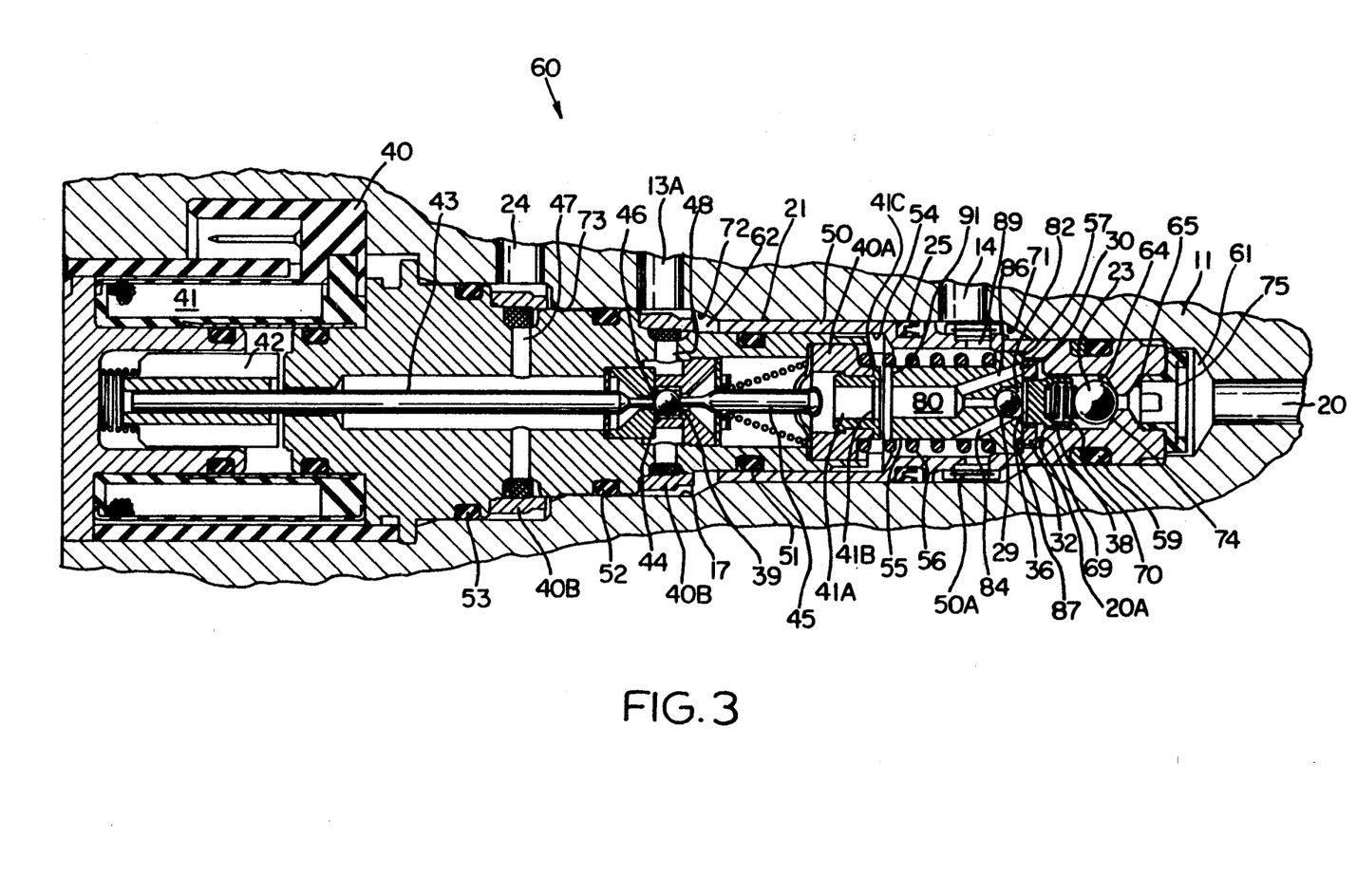
FIG. 3 is an enlarged section view of the combination solenoid valve and shuttle valve of FIGS. 1 and 2.

Referring to FIG. 3, the combination solenoid valve and shuttle valve of the present invention is designated generally by reference numeral 60. Solenoid valve and shuttle valve 60 includes decay solenoid valve 40 and shuttle valve 50. Body 11, such as a modulator body, includes therein stepped bore 17 which comprises first section 71, second section 72, and third section 73. Solenoid valve 40 includes windings 41 disposed about spring biased armature 42 connected with solenoid rod 43 that engages ball valve 44. Ball valve 44 is also biased by spring biased rod 45 so that, at rest, ball valve 44 engages valve seat 46 and valve seat 39 is open. Solenoid valve 40 includes lateral openings 47 and 48 which connect, respectively, with line 24 communicating with sump 22 and pump inlet 18, and line 13A which communicates with wheel brake 16. Located around each opening 47, 48 is a filter 40B. Three seals 51, 52 and 53 are located about the exterior of solenoid valve 40. Solenoid valve 40 and stepped bore 17 define with seals 51 and 52 a portion of second bore section 72, while seals 52 and 53 define with stepped bore 17 and solenoid valve 40 the third bore section 73.

Shuttle valve 50 includes a stepped exterior profile and a stepped interior opening 54 whose surface slidably and sealingly engages solenoid valve seal 51. Stepped interior opening 54 includes shuttle insert 55 which is biased by spring 56 so that shuttle valve 50 is biased away from solenoid valve 40. Solenoid valve 40 includes solenoid insert 40A which provides a seat for spring 56. Insert 40A includes an insert seat 41C, and interior through opening 41A and filter 41B so that fluid may be communicated toward ball valve 44 and valve seats 39 and 46. Located about the exterior of shuttle valve 50 are two axially spaced-apart seals 25 and 59. Seal 25 is a lip type seal which prevents fluid about the exterior of valve 50 from flowing toward solenoid valve 40, while permitting, at certain pressure differentials, fluid in stepped bore 17 and located on the solenoid side of seal 25 to flow past seal 25 toward master cylinder line 14. Alternatively, seal 25 may be an 0-ring seal (see also FIG. 3A) that will fully isolate the first bore section 71 from the second bore section 72, and the ball check valve 29, described above and below, permits fluid to bypass just the shuttle valve 50 during the release phase of braking which includes a pressure differential between the wheel brake and master cylinder pressures. Seals 59 and 25 define first bore section 71, while seal 25 and seal 52 define portions of second bore section 72.

Shuttle valve stepped interior opening 54 includes end interior cavity 64 and end exterior cavity 65. Shuttle insert 55 is biased by spring 56, and insert 55 is attached to valve 50 in the area adjacent shoulder 57 such that the check valve or floating washer 32 is captured between insert 55 and shoulder 69. A check valve or poppet 38 is biased by spring 70 into engagement with an end of insert 55 while spring 70 also biases the pump check valve 23 into engagement with seat 74. Poppet 38 includes a small diagonal groove which comprises the feedback orifice 36. Filter 75 is located at the end of shuttle valve 50 so that fluid received from pump 18 via line 20 is filtered. Shuttle valve insert 55 includes stepped through opening 80 which includes cavity 82 housing ball check valve 29. Insert 55 includes first angled opening 84 which communicates between a side of insert 55 and cavity 82. Second angled opening 86 communicates between stepped through opening 80 and end 87 of insert 55. End 87 includes laterally extending build orifice or groove 30 which communicates with angled opening 86 and is covered by the check valve or washer 32. Filter 50A is disposed about shuttle valve 50 so that fluid flow between the interior opening of shuttle valve 50 and passage or line 14 communicating with master cylinder 12 is through the filter.

During normal braking, fluid pressure is generated in master cylinder 12 and transmitted via line 14 to shuttle valve 50 where it communicates with stepped interior opening 54 via shuttle lateral openings 89. The fluid passes around shuttle valve insert end 91 and past solenoid insert seat 41C, through opening 41A, past valve seat 39 and ball valve 44 and through lateral openings 48 to brake line 13A and wheel brake 16. When an imminent wheel skid is sensed by the not shown wheel speed sensors and ECU 200 of adaptive braking system 10, ECU 200 activates solenoid valve 40 which displaces rod 43 against ball valve 44 so that fluid pressure at brake 16 may decay past open valve seat 46, through openings 47 and to line 24 and the inlet of pump 18. At the same time, pump 18 is activated to provide increased fluid pressure via line 20 connected with the end of shuttle valve 50. As illustrated in FIGS. 1 and 3, shuttle valve 50 receives the increased fluid pressure from pump 18 via connection 61 while the reduced or decaying fluid pressure at the brake is communicated with shuttle valve 50 via connection 62, such that shuttle valve 50 is displaced toward the left in FIG. 3 so that end 91 of shuttle valve insert 55 engages valve seat 41C and effectively isolates master cylinder 12 from most of the pressure generated by pump 18. Thus, the normal brake fluid path from the master cylinder to the wheel brake is effectively shut off by the translation of shuttle valve 50 to the left against spring 56 so that insert end 91 engages cooperatively valve seat 41C. Shuttle valve 50 will stay in this translated or stroked position during the entire antilock braking system cycle. During this time, fluid pressure from pump 18 causes ball check valve 23 to open and permit fluid to flow past the perimeter of poppet 38 and about one way build orifice check valve or washer 32 and into build orifice 30, through second angled opening 86 and interior through opening 80, past valve seat 39 and ball valve 44, and to lateral openings 48 for communication with wheel brake 16. As solenoid valve 40 operates, rod 43 modulates ball valve 44 to simultaneously reduce the amount of pump generated brake fluid pressure being transmitted to wheel brake 16 via line 13A and effect the decay of brake fluid pressure from the brake toward sump 22 via lateral openings 47 and line 24.

Pump 18 also transmits some fluid pressure back toward master cylinder 12 via feedback orifice 36. In FIG. 3, feedback orifice 36 comprises diametral groove 36 in the poppet 38 such that fluid pressure transmitted through orifice 36 enters cavity 82, is transmitted through first angled opening 84 to the periphery of insert 55, through lateral openings 89 and to passage or line 14 and toward master cylinder 12. Should fluid pressure received from the master cylinder ever exceed the fluid pressure generated by pump 18, which could occur depending on the amount of fluid available to pump 18 via line 24, then poppet 38 operates as a check valve in that fluid pressure received from master cylinder 12 via line 14 and first angled opening 84 will cause poppet 38 to lift off of the end of insert 55 and communicate the fluid which flows about one way build orifice check valve or washer 32, through fluid orifice 30 and second angled opening 86 and toward wheel brake 16.

Ball check valve 29 located within chamber 82 permits fluid to flow from wheel brake 16, via solenoid valve 40, to bypass shuttle valve 50 and communicate with master cylinder 12 via line 14. Fluid flows from wheel brake 16, connection 13A, through solenoid valve 40, through openings 41A and 80, past valve 29, into cavity 82 and first angled opening 84, through lateral openings 89 to line 14 and back toward master cylinder 12. During the release phase of braking and post antilock braking system operation, fluid pressure at the master cylinder will typically be less than the fluid pressure at wheel brake 16 and line 13A. In order to ensure that fluid may flow through the release or bypass line 21 which permits fluid to flow directly from wheel brake 16 toward master cylinder 12 via lines 15 and 14 (see FIG. 1), lip seal 25 comprises a one way flow restricter or type of check valve which, when the pressure in line 13A is greater than that in lines 14 and 15, permits flow therepast and about the periphery of shuttle valve 50 (see FIG. 3) and toward master cylinder 12.

The combination solenoid valve and shuttle valve 60 of the present invention provides the simplified circuit illustrated in FIG. 2 while providing the complexity of functions and communications illustrated schematically in FIG. 1. As is readily apparent, the present invention provides a significant step forward in the easy installation of an adaptive braking system as illustrated in FIG. 2 while providing the desired complexity of functions and capability required for state of the art adaptive braking systems.

Figure 3A:
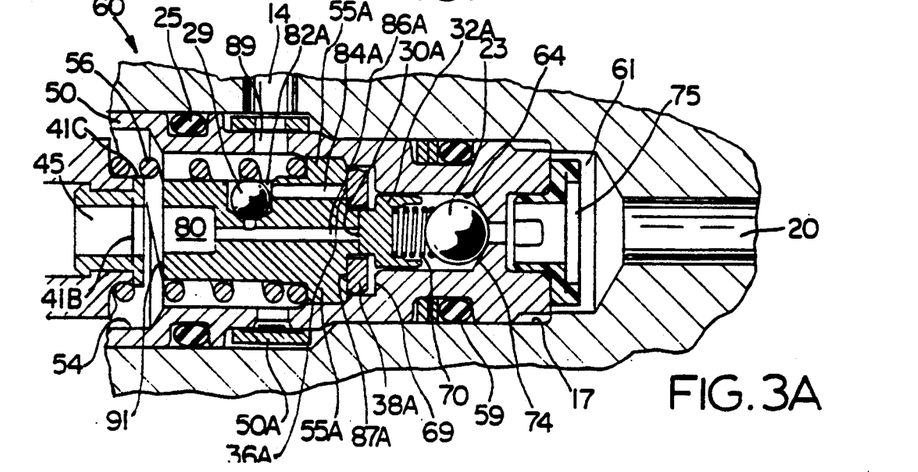
FIG. 3A is an enlarged section view of an alternative embodiment of a portion of FIG. 3.

FIG. 3A is an illustration of an alternative embodiment of a portion of the combination solenoid valve and shuttle valve 60 illustrated in FIG. 3. Shuttle valve 50 includes stepped opening 54 communicating with line 14 via lateral openings 89 covered by filter 50A. Located about shuttle valve 50 is O-ring seal 25 as discussed above. Shuttle valve insert 55A provides a seat for spring 56 which biases the shuttle valve 50 away from the solenoid valve 40 of FIG. 3. Shuttle valve 50 includes end interior cavity 64 housing spring 70 biasing the pump check valve 23 into engagement with seat 74. Spring 70 also biases build poppet 32A into engagement with end 87A of shuttle valve insert 55A. Build orifice 30A is disposed laterally across the end of shuttle valve insert 55A and communicates with opening or passage 86A that communicates with opening 80. Opening or passage 84A communicates between end 87A and cavity or passage 82A. Feedback orifice 36A extends laterally across end 87A to communicate with opening 84A, and is covered by check valve or floating feedback washer 38A which can move between end 87A and shoulder 69 of shuttle valve 50. Located within cavity 82A is ball check valve 29 closing communication of cavity 82A with opening 86A and opening 80.

During normal braking and adaptive braking system operation, the combination solenoid valve and shuttle valve 50 with the alternative structure illustrated in FIG. 3A operates as discussed above for FIGS. 1-3. During normal braking, pressure received from the master cylinder via line 14 is transmitted through lateral openings 89 to stepped opening 54, past insert seat 91, through filter 41B and through opening 45 to the solenoid valve. During adaptive braking system operation, the lower pressure at the wheel brake as a result of decaying wheel brake pressure, and the higher pressure transmitted by the pump 18 (FIG. 1) and via connection 61, causes shuttle valve 50 to move to a stroked or displaced position wherein seat 91 seats sealingly over seat 41C in order to isolate the master cylinder. Fluid pressure from pump 18 passes by the displaced ball check valve 23, around build poppet 32A, and through build orifice 30A to openings 86A and 80, as it is transmitted to the solenoid valve. Fluid pressure from the pump is also transmitted around build poppet 32A, floating feedback washer 38A and through feedback orifice 36A to opening 84A for transmission back toward the master cylinder via line 14. Should the pump provide fluid pressure, due to insufficient fluid, lower than fluid pressure being transmitted by the master cylinder, floating washer 38A may be displaced toward shoulder 69 so that fluid from line 14, lateral openings 89, cavity 82A, and opening 84A, flows freely past floating feedback washer 38A and through build orifice 30A, for subsequent transmission to the solenoid valve. During the release phase of braking, fluid pressure from the wheel brake may flow from the solenoid valve, through openings 80 and 86A, past displaced check ball valve 29 and through cavity 82A to lateral openings 89 and line 14, thereby bypassing the shuttle valve 50 during the release phase of braking. Because O-ring seal 25 is utilized about shuttle valve 50, the bypass release line 21 illustrated in FIG. 1 is not provided.

Figure 4:
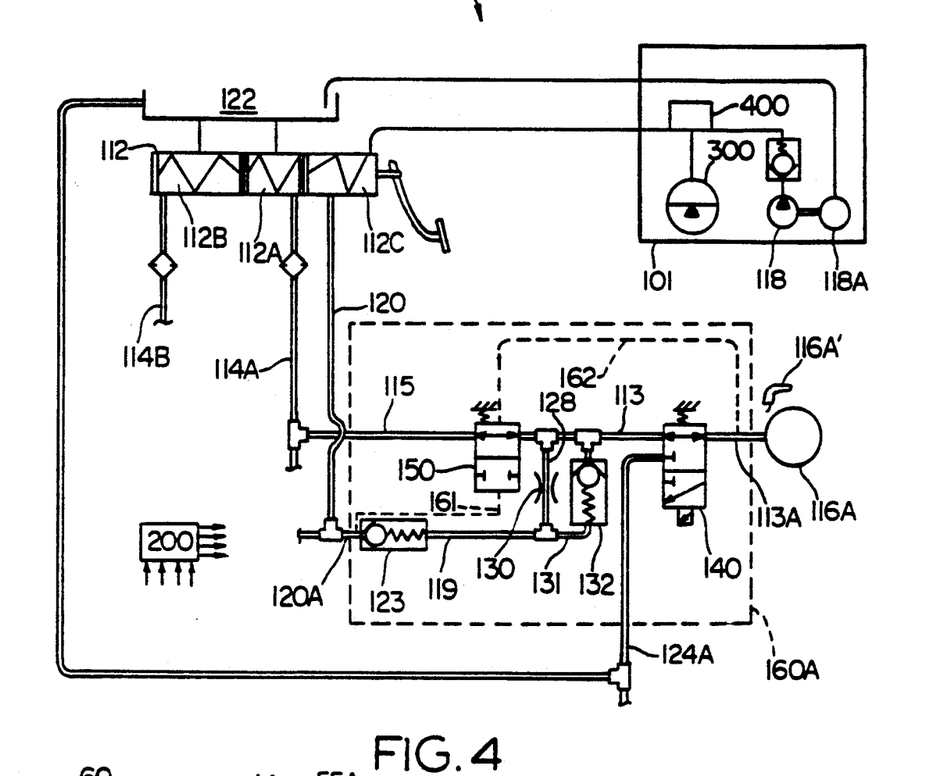
FIG. 4 is a schematic illustration of the equivalent functions of a replenishment type adaptive braking system utilizing a combination solenoid valve and check valve of the present invention.
Figure 5:
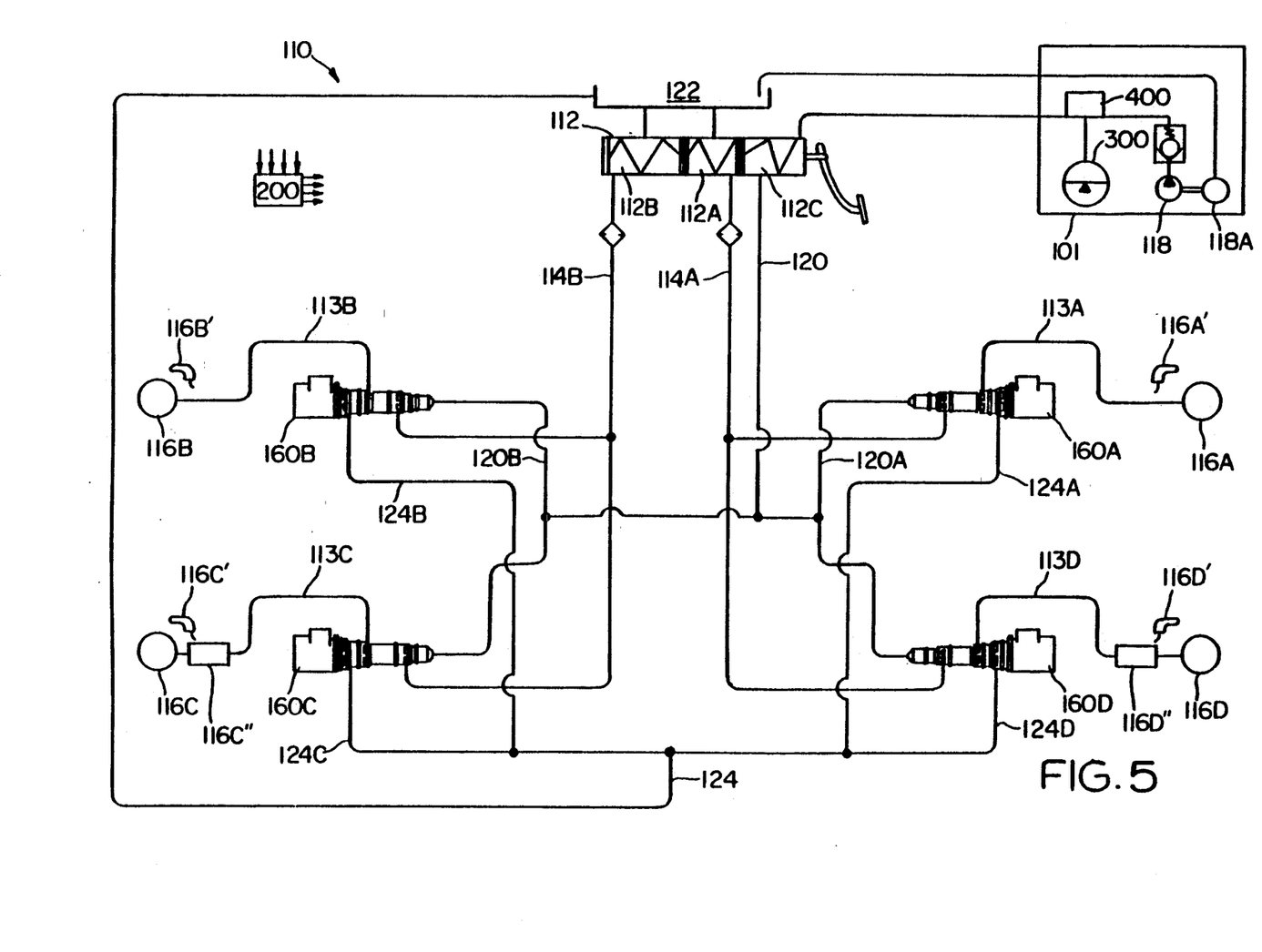
FIG. 5 is a schematic of the adaptive braking system of FIG. 4 and illustrating the plumbing connections effected by a combination solenoid valve and shuttle valve of the present invention.

FIG. 4 is a schematic illustration of the equivalent functions of a replenishment type adaptive braking system 110 which utilizes an embodiment of the combination solenoid valve and shuttle valve of the present invention, and FIG. 5 illustrates the actual plumbing connections of the circuit of FIG. 4. Similar structure is identified by the same reference numeral increased by 100. Full power hydraulic booster 112 includes a pair of chambers 112A and 112B which, during activation of the booster by the brake pedal, receive a hydraulic boost from boost chamber 112C. Hydraulic booster 112 receives fluid pressure from a motor pump/accumulator pressure source 101 comprising motor 118A which drives pump 118 to provide fluid pressure to accumulator 300, the electric motor and pump being controlled by pressure switch controller 400. Pump 118 operates as needed during the operation of the vehicle so that a constant fluid pressure is always available to the valving mechanism of boost chamber 112C of hydraulic booster 112. Braking pressure from chamber 112A is communicated via line 114A to the combination solenoid valve and shuttle valve 160A whose functions are illustrated schematically within the dotted line box of FIG. 4. Combination solenoid valve and shuttle valve 160A includes shuttle valve 150 which receives braking pressure from chamber 112A of hydraulic booster 112, the braking pressure being transmitted via line 113 through solenoid valve 140 and to line 113A and wheel brake 116A. Boost chamber 112C provides, during actuation of hydraulic booster 112, boost pressure to line 120, through check valve 123, to line 119 and build orifice 130, line 131 and one-way check valve 132. Build orifice 130 communicates via line 128 with line 113, solenoid valve 140, line 113A and wheel brake 116A. During normal braking, pressure generated in chamber 112A is transmitted via line 114A through line 115, shuttle valve 150, line 113, solenoid valve 140, through line 113A, and to wheel brake 116A. Likewise, boost pressure from boost chamber 112C is transmitted via line 120 through check valve 123, through line 119, to line 128 and through fluid flow orifice or restriction 130 to line 113 and on to wheel brake 116A. Pressure received from line 119 and transmitted to line 131 is blocked by one-way check valve 132. Because shuttle valve 150 receives pressures from connections 161 and 162 which approximate one another, the shuttle valve does not stroke or displace during normal braking operation. When an imminent wheel skid is sensed by ECU 200 via wheel speed sensor 116A', solenoid valve 140 is activated in order to decay fluid pressure away from wheel brake 116A. Shuttle valve 150 senses the decayed fluid pressure via connection 162 and the higher fluid boost pressure via connection 161, and displaces or strokes to a closed position whereby pressure from chamber 112A of hydraulic booster 112 is isolated from communicating with solenoid valve 140. In order to build braking pressure at wheel brake 116A, pressurized fluid is received at solenoid valve 140 via build orifice 130 and line 113. Solenoid valve 140 modulates between open and closed positions in order either to build braking fluid pressure or to decay braking fluid pressure back to the hydraulic brake booster reservoir via line 124A. When adaptive braking system operation is terminated, solenoid valve 140 returns to the illustrated at rest position, and the shuttle valve, which senses lower fluid pressure from hydraulic booster 112 and higher fluid pressure from wheel brake 116A, returns to an unstroked or at rest position so that fluid may flow freely back toward hydraulic booster 112.

The replenishment type adaptive braking system whose functions are illustrated schematically in FIG. 4 is illustrated in full in FIG. 5. The replenishment adaptive braking system of FIG. 5 is designated generally by reference numeral 110 and comprises an X or cross-connected braking system wherein left front wheel brake 116B and right rear wheel brake 116C receive via line 114B fluid from chamber 112B of hydraulic booster 112, while right front wheel brake 116A and left rear wheel brake 116D receive via line 114A fluid pressure from chamber 112A of hydraulic booster 112. Rear wheel brakes 116C and 116D have associated proportioning valves 116C" and 116D". Boost chamber 112C communicates via lines 120, 120A and 120B with the combination solenoid valve and shuttle valves 160A-D in accordance with the present invention.

Figure 6:
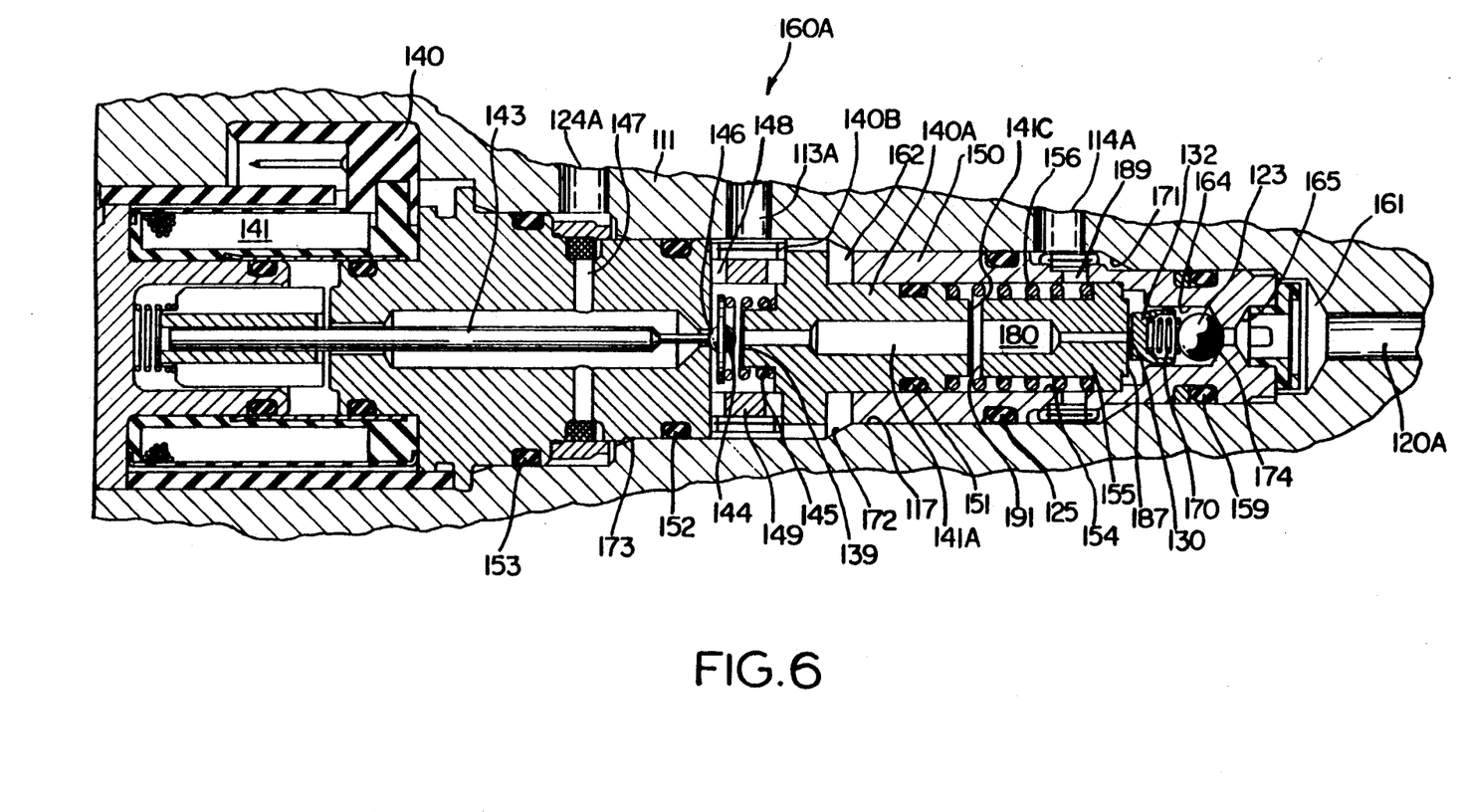
FIG. 6 is an enlarged section view of the combination solenoid valve and shuttle valve of FIGS. 4 and 5.

The combination solenoid valves and shuttle valves 160A, B, C, and D are similar to the combination solenoid valve and shuttle valve illustrated in FIG. 3, and this particular embodiment is illustrated in FIG. 6. Although the combination solenoid valve and shuttle valve of FIG. 3 may be utilized in the system illustrated in FIGS. 4 and 5, a slightly simplified embodiment as illustrated in FIG. 6 may be used. During a normal brake apply, pressurized fluid is provided to each wheel brake via either chamber 112A or 112B of hydraulic booster 112, while pressurized fluid from boost chamber 112C is also provided to the wheel brakes via lines 120, 120A, 120B and the respective combination solenoid valves and shuttle valves. The shuttle valve of each combination does not stroke or displace because the pressures at lines 113A and B approximate the pressures from lines 120A and B and 114A and B.

When an insipient wheel skid is sensed by any one of the wheel speed sensors 116A', 116B', 116C', and 116D', the ECU 200 activates the appropriate solenoid valve(s) so that pressure at the respective wheel brake(s) is decayed through the associated decay or return line (see return lines 124A-D) back to return line 124 and reservoir 122. When the brake pressure at the respective wheel brake decays, the differential between the decaying brake pressure and the pressure being transmitted via boost chamber 112C of hydraulic booster 112 causes the shuttle valve of the respective combination solenoid valve and shuttle valve to displace to the previously discussed stroked position and isolate the respective chamber 112A or 112B from the associated wheel brake. Build fluid pressure to the wheel brake is provided via the boost circuit comprising boost chamber 112C, line 120 and respective line 120A or 120B. The build fluid pressure proceeds through the respective combination solenoid valve and shuttle valve 160A-D, in accordance with the explanation provided above for FIG. 4, to the respective connecting line 113A–D and associated wheel brake. The combination solenoid valves and shuttle valves 160A–D operate as described above for the structures and functions illustrated in FIGS. 4 and 5, and as illustrated in detail below for valve 160A of FIG. 6.

Referring to FIG. 6, combination solenoid valve and shuttle valve 160A which is identical to solenoid and shuttle valves 160B–D comprises solenoid valve 140 having windings 141 which, when energized, displace rod 143 against ball valve 144 and open valve seat 146 so that fluid may flow to lateral opening 147 and return line 124A. Solenoid valve 140 abuts body member 149 which contains lateral openings 148 that communicate via filter 140B with line or passage 113A connected with wheel brake 116A (see FIG. 5). Shuttle valve 150 includes stepped interior opening 154 having fixed therein shuttle insert 155 which includes through opening 180. Spring 156 disposed between insert 140A and shuttle valve insert 155 biases shuttle valve 150 away from solenoid valve 140. Insert 140A includes insert seat 141C located opposite from end 191 of insert 155. Body member 149 and insert 140A comprise a stationary valve part which can be located, along with shuttle valve 150, in stepped bore 117 prior to the insertion of solenoid valve 140. This permits solenoid valve 140 to be assembled separately and then inserted as a unit into bore 117. Stepped interior opening 154 includes end interior cavity 164 and end exterior cavity 165. Cavity 164 includes check valve 123 biased by spring 170 into engagement with seat 174. Spring 170 also biases check valve 132 against end 187 of shuttle valve insert 155. Check valve 132 includes diametral opening or build orifice 130 which communicates with stepped through opening 180. Disposed about the exterior of shuttle valve 150 are seals 159 and 125. Seal 125 is an O-ring type of seal rather than the lip type of seal 25 illustrated in FIG. 3. Disposed about solenoid valve 140 are seals 152 and 153. Seals 152 and 153 define stepped bore section 173, while seals 152, 125 and 151 define with the bore and associated structure the second bore section 172. Seals 125 and 159 define the first bore section 171.

Referring to FIGS. 4–6, combination solenoid valve and shuttle valve 160A receives fluid during normal braking via line 114A such that the fluid passes through openings 189, past end 191 and seat 141C, through opening 141A and lateral openings 148 to line 113A for communication with wheel brake 116A. Boost pressure from boost chamber 112C of hydraulic booster 112 is received via line 120A and opens ball check valve 123 in order to flow through build orifice 130 and toward the wheel brake. Because shuttle valve 150 receives fluid pressures from lines 114A and 120A that approximate one another and approximate the pressure in line 113A, shuttle valve 150 does not move to a stroked position during normal braking. When an insipient wheel skid is sensed by wheel speed sensor 116', ECU 200 activates solenoid valve 140 to cause displacement of rod 143 and movement of ball valve 144 away from valve seat 146. Fluid pressure at wheel brake 116A is decayed away from the wheel brake through line 113A, lateral openings 148, past open valve seat 146 and to lateral openings 147 and return line 124A. Shuttle valve 150 which is receiving simultaneously boost pressure via line 120A, senses the pressure differential via connections 161 and 162 and moves to a stroked position wherein end 191 of valve insert 155 sealingly engages insert seat 141C in order to isolate hydraulic booster chamber 112A from communication with wheel brake 116A. Fluid pressure from boost chamber 120C continues to be transmitted toward ball valve 144 via build orifice 130, stepped through opening 180, and interior through opening 141A so that as rod 143 and ball valve 144 are modulated by the solenoid valve, wheel brake 116A receives either build fluid pressure in order to effect braking or has braking fluid pressure decayed away from the wheel brake in order to effect continuous movement of the associated wheel, as appropriate.

Figure 7:
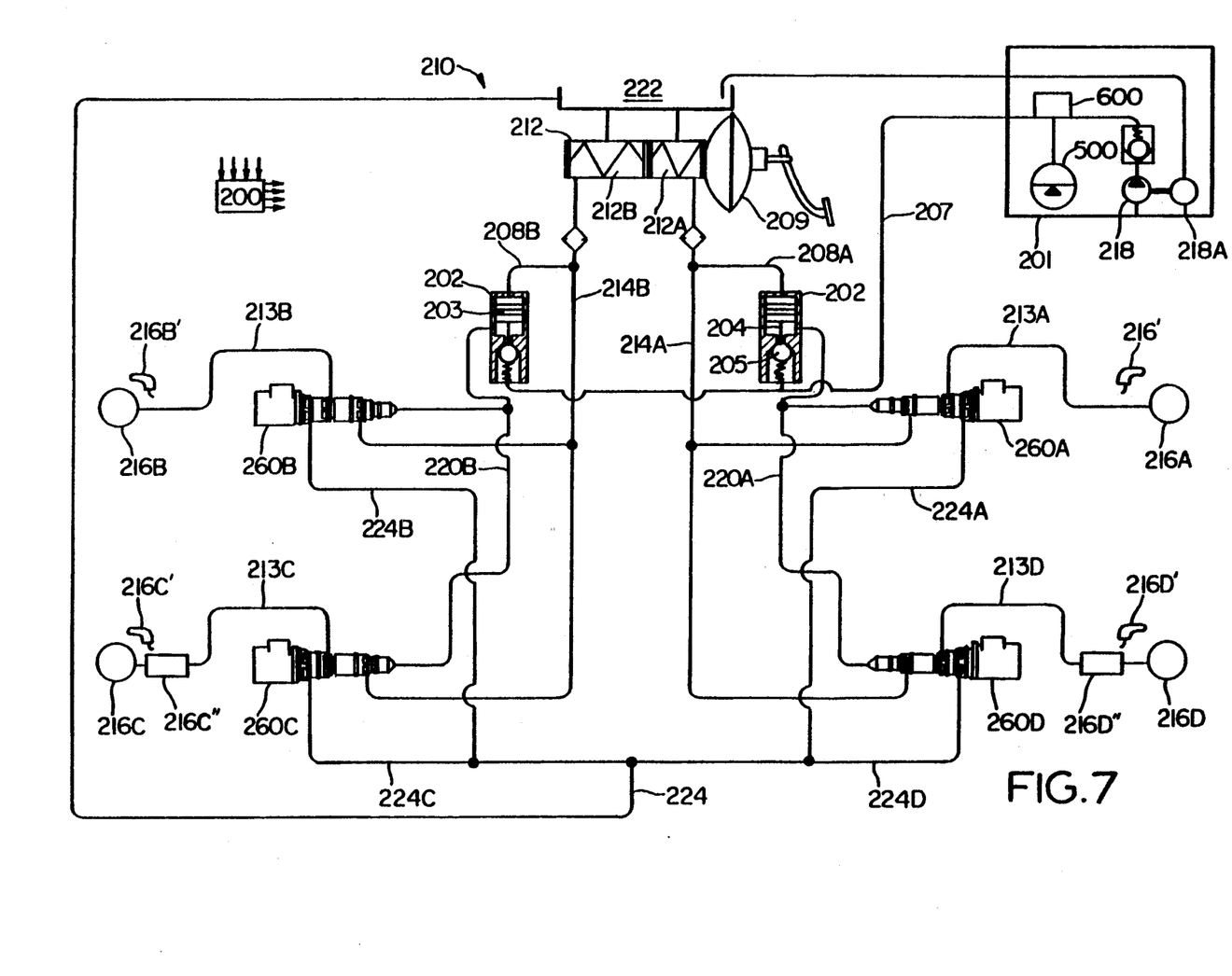
FIG. 7 is a schematic of an adaptive braking system utilizing a vacuum boosted master cylinder to operate fluid pressure regulators and the system having the combination solenoid valve and shuttle valve of FIG. 6.

Referring to FIG. 7, there is provided a schematic illustration of an adaptive braking system 210 which utilizes a vacuum boosted master cylinder to operate fluid pressure regulators receiving fluid pressure from a pressure source typically associated with the replenishment type adaptive braking system illustrated in FIG. 5. Adaptive braking system 210 includes master cylinder 212 having chambers 212A, 212B and actuated by vacuum brake booster 209. Pressure source 201 includes pumping section 218 driven by motor 218A to provide fluid to accumulator 500 and operated by pressure switch 600 as described above for pressure source 101 for the adaptive braking system of FIGS. 4 and 5. Pressure source 201 receives fluid from master cylinder reservoir 222 and transmits fluid pressure via line 207 to a pair of pressure regulators 202. Adaptive braking system 210 comprises an X or cross-connected braking system that is the same as the system illustrated in FIG. 5 with the exception of regulators 202, vacuum booster 209 and the provision of fluid pressure to the regulators rather than to a boost chamber of the master cylinder. Pressure chamber 212A of master cylinder 212 supplies fluid pressure via line 214A to each of the combination solenoid valves and shuttle valve 260A and 260D connected, respectively, with the right front wheel brake and left rear wheel brake. Master cylinder pressure chamber 212B, in like manner, supplies fluid pressure via line 214B to the combination solenoid valves and shuttle valves 260B and 260C connected, respectively, to the left front wheel brake and right rear wheel brake. Each of the chambers 212A, 212B also supplies fluid pressure via respective lines 208A, 208B to regulators 202, each of which comprises piston 203 having actuation rod 204 which engages ball valve 205. When pressure from chambers 212A, 212B effects a displacement of the respective pistons 203, ball valves 205 are opened so that fluid pressure via line 207 is communicated past the associated ball valve seat and into the respective boost line 220A, 220B for communication to the four combination solenoid valves and shuttle valves 260A–D. The combination solenoid valves and shuttle valves 260A–D are identical to the combination solenoid valve and shuttle valve 160A illustrated in FIG. 6. Other than the utilization of a vacuum brake booster to operate the master cylinder and the regulator valves for providing fluid pressure from the pressure source to the braking system, the vacuum boosted master cylinder adaptive braking system of FIG. 7 operates the same as described above for the replenishment type adaptive braking system described in FIGS. 4–6.

We claim:

1. A combination solenoid valve and shuttle valve, comprising a body having therein a bore comprising a first bore section, second bore section, and third bore section sealingly isolated from one another at the perimeter of the bore, the solenoid valve disposed within the bore and operable to open a valve therein in order to communicate said second bore section with said third bore section, and the shuttle valve disposed sealingly and slidably within said first and second bore sections, the shuttle valve having an interior opening which is received sealingly and slidably at an end of said solenoid valve, said solenoid valve including a seal member engaging a surface of the interior opening of said shuttle valve, the bore communicating at one end with a pressure source and the shuttle valve slidable to cooperate with said end of the solenoid valve in order to direct fluid from the pressure source primarily to the valve of the solenoid valve, a portion of the shuttle valve engageable with a valve seat of the solenoid valve so that fluid from said pressure source flows primarily through the shuttle valve and to the valve of the solenoid valve.

2. The combination solenoid valve and shuttle valve in accordance with claim 1, wherein the shuttle valve includes an insert having a through passage between first and second insert end openings, a first opening extending between the first insert end opening and a side of the insert, and a second opening extending between the through passage and a first end of said insert.

3. The combination solenoid valve and shuttle valve in accordance with claim 1, further comprising a poppet disposed within said shuttle valve and comprising a poppet member disposed over said first insert end opening, the poppet member having a diagonally extending groove across an end thereof which communicates with said first insert end opening in order to permit some fluid flow to said first opening and first bore section.

4. The combination solenoid valve and shuttle valve in accordance with claim 3, wherein the shuttle valve further includes a floating washer disposed about the first insert end opening, the first end of the insert including a laterally extending groove thereacross which is covered by said washer such that fluid from said pressure source flows around the washer and into the laterally extending groove in order to communicate with the second opening.

5. A combination solenoid valve and shuttle valve, comprising a body having therein a bore comprising a first bore section, second bore section, and third bore section sealingly isolated from one another at the perimeter of the bore, the solenoid valve disposed within the bore and operable to open a valve therein in order to communicate said second bore section with said third bore section, and the shuttle valve disposed sealingly and slidably within said first and second bore sections, the shuttle valve having an interior opening which is received sealingly and slidably at an end of said solenoid valve, the shuttle valve including an insert having a through passage between first and second insert end openings, a first passage extending between a first insert end and a side passage of the insert, and the side passage extending between a side opening and the through passage, the bore communicating at one end with a pressure source and the shuttle valve slidable to cooperate with said end of the solenoid valve in order to direct fluid from the pressure source primarily to the valve of the solenoid valve, a portion of the shuttle valve engageable with a valve seat of the solenoid valve so that fluid from said pressure source flows primarily through the shuttle valve and to the valve of the solenoid valve.

6. The combination solenoid valve and shuttle valve in accordance with claim 5, further comprising a poppet disposed within said shuttle valve and comprising a poppet member disposed over said first insert end opening, the first insert end having a diagonally extending groove which communicates with said first insert end opening in order to permit fluid flow to said through passage.

7. The combination solenoid valve and shuttle valve in accordance with claim 6, wherein the shuttle valve further includes a floating washer disposed about the first insert end opening, the first insert end including a laterally extending groove thereacross which is covered by said washer such that fluid from said pressure source flows around the washer and into the laterally extending groove in order to communicate with the side opening.

8. A combination solenoid valve and shuttle valve, comprising a body having therein a bore comprising a first bore section, second bore section, and third bore section sealingly isolated from one another at the perimeter of the bore, the solenoid valve disposed within the bore and operable to open a valve therein in order to communicate said second bore section with said third bore section, a stationary valve part at an end of the solenoid valve, and the shuttle valve disposed sealingly and slidably within said first and second bore sections, the shuttle valve having an interior opening which is received sealingly and slidably at the solenoid valve part adjacent the end of said solenoid valve, said valve part including a seal member engaging a surface of the interior opening of said shuttle valve, resilient means disposed within said interior opening of the shuttle valve, the resilient means biasing said shuttle valve away from said solenoid valve, the bore communicating at one end with a pressure source and the shuttle valve slidable to cooperate with said valve part in order to direct fluid from the pressure source to the valve of the solenoid valve, a portion of the shuttle valve engageable with a valve seat of the solenoid valve part so that the first bore section is isolated from the second bore section and fluid from said pressure source may flow through the shuttle valve and to the valve of the solenoid valve.

9. The combination solenoid valve and shuttle valve in accordance with claim 8, wherein the shuttle valve includes an insert having a through passage between first and second insert end openings.

10. The combination solenoid valve and shuttle valve in accordance with claim 9, further comprising a poppet disposed within said shuttle valve and comprising a poppet member disposed over said first insert end opening, the poppet member having a diagonally extending groove across an end thereof which communicates with said first insert end opening in order to permit restricted fluid flow to said through passage.

11. The combination solenoid valve and shuttle valve in accordance with claim 10, further comprising a spring disposed between said poppet member and a ball check valve, the ball check valve engaging a valve seat of the shuttle valve.

12. The combination solenoid valve and shuttle valve in accordance with claim 8, wherein the shuttle valve includes a fluid flow orifice so that fluid from the pressure source may flow through the shuttle valve.

13. The combination solenoid valve and shuttle valve in accordance with claim 8, further comprising, in combination, an adaptive braking system including a hydraulic booster communicating with said first bore section, pump means communicating with said hydraulic booster boost chamber which comprises said pressure source, reservoir means communicating with the third bore section, and a wheel brake communication with said second bore section.

14. The combination solenoid valve and shuttle valve in accordance with claim 8, further comprising, in combination, an adaptive braking system including a vacuum booster operated master cylinder communicating with said combination solenoid valve and shuttle valve and with a regulator valve, the regulator valve communicating with the combination solenoid valve and shuttle valve which communicates with a wheel brake, a pressure source communicating with the regulator valve, and return line means between the combination solenoid valve and shuttle valve and reservoir means.

15. An adaptive braking system for a vehicle, the system including a pressure producing device for actuation by a vehicle operator, a first braking circuit communicating hydraulically said pressure producing device with at least one wheel brake for controlling a wheel, the circuit comprising shuttle valve means and solenoid valve means in a first fluid communication extending between said wheel brake and said pressure producing device, a second fluid communication extending from a junction with said first fluid communication and bypassing said shuttle valve means to connect with the first fluid communication at a point between said shuttle valve means and solenoid valve means, the second fluid communication including a fluid flow restriction at a portion thereof, a bypass fluid communication for said portion of the second fluid communication and including first valve means so that fluid pressure may bypass around said fluid flow restriction, and a return fluid communication extending between the solenoid valve means and a fluid communication junction with said second fluid communication and including pump means for providing fluid pressure to said second fluid communication, the fluid flow restriction permitting restricted fluid pressure from said pump means to be transmitted to said pressure producing device, and said bypass fluid communication and first valve means permitting higher fluid pressure generated at said pressure producing device to bypass said fluid flow restriction and be transmitted to the solenoid valve means for transmission to said wheel brake when a lower fluid pressure is provided by said pump means, and the second fluid communication including in parallel a second fluid flow restriction communicating with said first fluid communication between said shuttle valve means and said solenoid valve means.

16. The system in accordance with claim 15, further comprising a second bypass fluid communication for said shuttle valve means so that fluid may flow from said solenoid valve means, by said shuttle valve means, and to the pressure producing device.

17. The system in accordance with claim 16, wherein the system comprises a third bypass fluid communication extending from between the solenoid valve means and said wheel brake to said first fluid communication at a point located between said shuttle valve means and said pressure producing device.

18. The system in accordance with claim 15, wherein the system includes a three-way fluid communication junction between said return fluid communication, said second fluid communication and said bypass fluid communication.

19. The system in accordance with claim 18, wherein said system includes a three-way fluid communication junction between said first fluid communication, said second fluid communication and said bypass fluid communication.

20. An adaptive braking system for a vehicle, the system including a pressure producing device for actuation by a vehicle operator, a first braking circuit communicating hydraulically said pressure producing device with at least one wheel brake for controlling a wheel, the circuit comprising shuttle valve means and solenoid valve means in a first fluid communication extending between said wheel brake and said pressure producing device, the shuttle valve means having an interior opening communicating with lateral openings through the shuttle valve means in order to permit uninterrupted fluid flow into the interior opening from said pressure producing device, a second fluid communication extending from a junction with said first fluid communication and bypassing said shuttle valve means to connect with the first fluid communication at a point between said shuttle valve means and solenoid valve means, the second fluid communication including a fluid flow restriction at a portion thereof, a bypass fluid communication said portion of the second fluid communication and including first valve means so that fluid pressure may bypass around said fluid flow restriction, and a return fluid communication extending between said solenoid valve means and a fluid communication junction with said second fluid communication and including pump means for providing fluid pressure to said second fluid communication, the fluid restriction permitting restricted fluid pressure from said pump means to be transmitted to said pressure producing device, and said bypass fluid communication and first valve means permitting higher fluid pressure generated at said pressure producing device to bypass said fluid flow restriction and be transmitted t the solenoid valve means for transmission to said wheel brake when a lower fluid pressure is provided by said pump means.

21. A combination solenoid valve and shuttle valve, comprising a body having therein a bore comprising a first bore section, second bore section, and third bore section sealingly isolated from one another at the perimeter of the bore, the bore communicating at one end with a pressure source and also communicating with master cylinder means, the solenoid valve disposed within the bore and operable to open a valve therein in order to communicate said second bore section with said third bore section, the shuttle valve disposed sealingly and slidably within the first and second bore sections, the shuttle valve having an interior opening which is received sealingly and slidably at an end of said solenoid valve, fluid flow restriction means communicating with the master cylinder means, and a bypass fluid communication for said fluid flow restriction means, the shuttle valve slidable to cooperate with said end of the solenoid valve in order to direct fluid from the pressure source primarily to the valve of the solenoid valve, and the bypass fluid communication permitting the master cylinder means to communicate fluid pressure to the valve of the solenoid valve without the shuttle valve returning slidably from cooperating with the end of the solenoid valve.

22. The combination solenoid valve and shuttle valve in accordance with claim 21, wherein the shuttle valve comprises a pair of spaced apart exterior seals which define said first bore section.

23. The combination solenoid valve and shuttle valve in accordance with claim 22, wherein one of said spaced apart seals comprises a generally V-shaped lip seal which also defines a portion of said second bore section.

24. The combination solenoid valve and shuttle valve in accordance with claim 21, further comprising a second pair of spaced apart seals disposed about the exterior of said solenoid valve, the second pair of spaced apart seals defining said third bore section and one end of said second bore section.

25. The combination solenoid valve and shuttle valve in accordance with claim 21, further comprising resilient means disposed within said interior opening of the shuttle valve, the resilient means biasing said shuttle valve away from said solenoid valve.

26. The combination solenoid valve and shuttle valve in accordance with claim 25, wherein the shuttle valve includes a fluid flow orifice so that fluid from the pressure source may flow toward said first bore section.

27. The combination solenoid valve and shuttle valve in accordance with claim 25, wherein the shuttle valve includes a fluid flow orifice so that fluid from the pressure source may flow toward the valve of the solenoid valve.

28. The combination solenoid valve and shuttle valve in accordance with claim 21, wherein the shuttle valve includes an insert having a through passage between first and second insert end openings, the first insert end opening including a first end cavity which includes therein a floating ball member which can prevent fluid from flowing between said first insert end opening and said second insert end opening.

29. The combination solenoid valve and shuttle valve in accordance with claim 21, wherein the shuttle valve includes an insert having a through passage between first and second insert end openings, the through passage communicating with a cavity which includes therein a floating ball member which can prevent fluid from flowing from said first bore section to said through passage.

30. The combination solenoid valve and shuttle valve in accordance with claim 21, wherein the shuttle valve includes a fluid flow orifice so that fluid from the pressure source may flow toward said first bore section.

31. The combination solenoid valve and shuttle valve in accordance with claim 21, wherein the shuttle valve includes a fluid flow orifice so that fluid from the pressure source may flow toward the valve of the solenoid valve.

32. An adaptive braking system including the combination solenoid valve and shuttle valve in accordance with claim 21, further comprising the master cylinder means communicating with said first bore section, pump means comprising said pressure source and communicating with said one end of the bore, return line means communicating between an inlet end of said pump and said third bore section, and a wheel brake communicating with said second bore section.

33. A combination solenoid valve and shuttle valve, comprising a body having therein a bore comprising a first bore section, second bore section, and third bore section sealingly isolated from one another at the perimeter of the bore, the bore communicating at one end with a pressure source and also communicating with a pressure producing source, the solenoid valve disposed within the bore and operable to pen a valve therein in order to communicate said second bore section with said third bore section, the shuttle valve disposed sealingly and slidably within said first and second bore sections, the shuttle valve having an interior opening which is received sealingly and slidably around an end of said solenoid valve, fluid flow restriction means communicating with the pressure producing source, and a bypass fluid communication for said fluid flow restriction means, the interior opening communicating with lateral openings through the shuttle valve to permit uninterrupted fluid flow into the interior opening from the pressure producing source, the shuttle valve slidable to cooperate with said end of the solenoid valve in order to direct fluid from the pressure source primarily to the valve of the solenoid valve, sand the bypass fluid communication permitting the pressure producing source to communicate fluid pressure to the valve of the solenoid without the shuttle valve returning slidably from cooperating with the end of the solenoid valve.

34. A combination solenoid valve and shuttle valve, comprising a body having therein a bore comprising a first bore section, second bore section, and third bore section sealingly isolated from one another at the perimeter of the bore, the bore communicating at one end with a pressure source and also communicating with a pressure producing source, the solenoid valve disposed within the bore and operable to open a valve therein in order to communicate said second bore section with said third bore section, the shuttle valve disposed sealingly and slidably within said first and second bore sections, the shuttle valve having an interior opening which is received sealingly and slidably at an end of said solenoid valve, fluid flow restriction means communicating with the pressure producing source, a bypass fluid communication for said restriction means, and the interior opening communicating with lateral openings through the shuttle valve, the shuttle valve slidable to cooperate with said end of the solenoid valve in order to direct fluid from the pressure source primarily to the valve of the solenoid valve, a portion of the shuttle valve engageable with a valve seat of the solenoid valve so that the first bore section is substantially isolated from the second bore section and fluid from said pressure source flows primarily through the shuttle valve and to the valve of the solenoid valve, the lateral openings permitting fluid flow into the interior opening from the pressure producing source so that fluid pressure from the pressure producing source may be provided to the interior opening when the shuttle valve engages the valve seat and substantially isolates the first bore section from the second bore section, and the bypass fluid communication permitting the pressure producing source to communicate the fluid pressure to the valve of the solenoid valve without the shuttle valve disengaging from the valve seat of solenoid valve.

* * * * *